M. SCHWARZ.
PASTRY CONE HOLDER.
APPLICATION FILED JULY 13, 1917. RENEWED MAR. 9, 1918.
1,265,392.  Patented May 7, 1918.
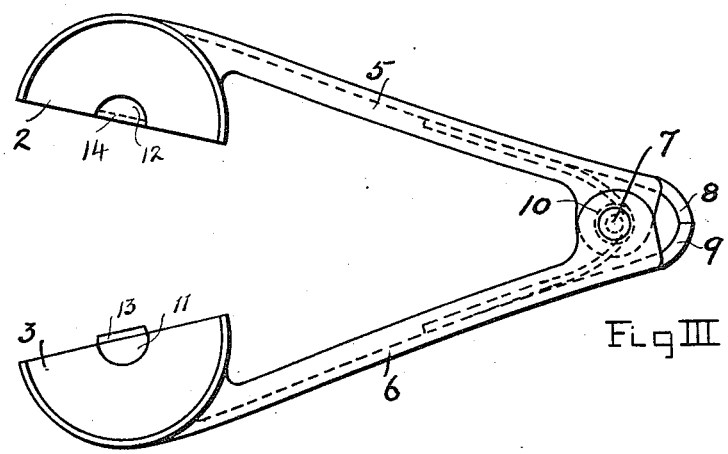
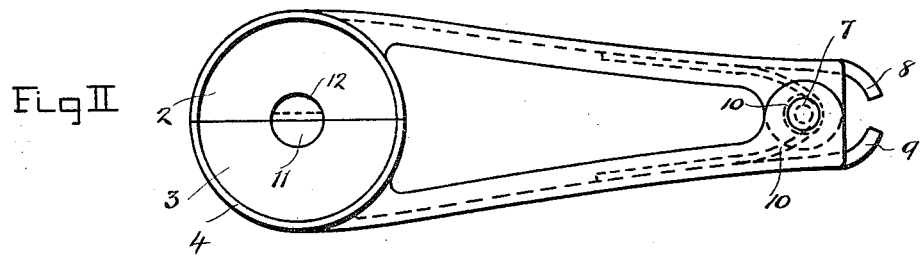
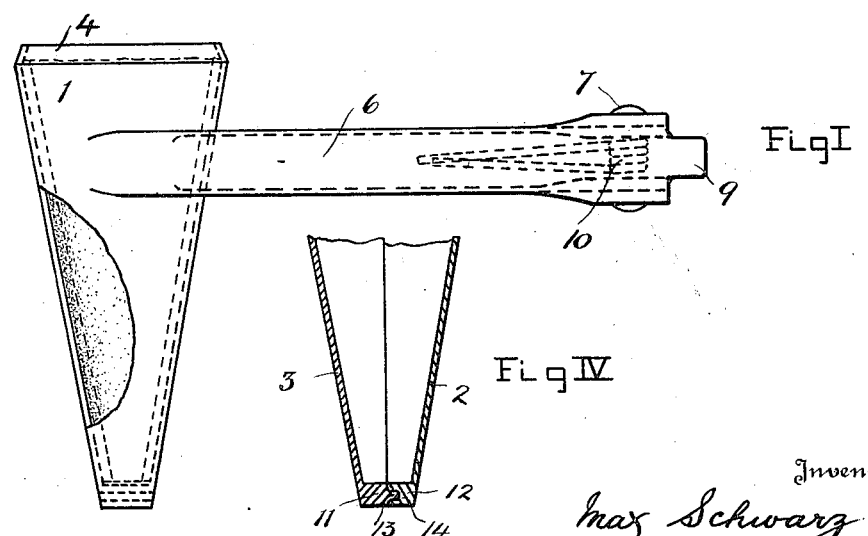
Witnesses
Inventor
Max Schwarz
By Arthur Scrivenor
Attorney

UNITED STATES PATENT OFFICE.

MAX SCHWARZ, OF RICHMOND, VIRGINIA.

PASTRY-CONE HOLDER.

1,265,392.            Specification of Letters Patent.       Patented May 7, 1918.

Application filed July 13, 1917, Serial No. 180,400. Renewed March 9, 1918. Serial No. 221,577.

*To all whom it may concern:*

Be it known that I, MAX SCHWARZ, a citizen of the United States, residing at Richmond, in the county of Henrico and State of Virginia, have invented certain new and useful Improvements in Pastry-Cone Holders, of which the following is a specification, reference being had therein to the accompanying drawing.

My invention relates to scoops or holders for ice cream pastry cones, and it is particularly adapted for holding the cone during the process of filling.

The object of my invention is to provide a holder which shall be simple to manufacture, inexpensive, sanitary, convenient and durable. Another object of my invention is to provide a holder which may be used as a scoop in the ice cream, the pastry cone being held within the holder.

In the drawings which accompany this specification, and in which like numerals refer to like parts in the several views: Figure I is a side elevation of my holder with a part of the cup cut away to show a pastry cone within it; Fig. II shows the closed holder in plan; Fig. III also in plan shows the holder open to its limit; and Fig. IV is a detail showing in section the lower part of the cup of the holder.

In Fig. I, 1 is the cup of the holder, formed by the two parts 2 and 3, which come together along their vertical edges. The upper edges of the parts 2 and 3 are turned slightly inward, as at 4, to stiffen the edge and also to act as a retainer for the pastry cone when in place in the cup.

The two parts 2 and 3 of the cup 1 are supported by the arms 5 and 6, which are of heavy sheet metal and formed to a half round. The arms 5 and 6 are connected by means of a pivot or hinge at 7. Formed by extensions of the arms 5 and 6, and beyond the pivot 7, are two stops 8 and 9, which coming together limit the opening between the two cup parts 2 and 3.

A spring 10 disposed around the hinge 7, its ends acting outwardly against the insides of the arms 5 and 6, tends to hold the instrument open. To use the instrument the two arms 5 and 6 are grasped by the hand and brought together until the cup parts 2 and 3 nearly meet. A pastry cone may now be dropped into place and the cup closed. Or the pastry cone may be picked up without touching it with the hand, using the instrument as one does a pair of tongs. If the pastry cone is standing on its larger end on a plate, the nearly closed holder is inverted and slipped down over the cone until the cup of the holder strikes the plate. Upon closing the cup the turned in edge 4 lifts the pastry cone into place, and prevents it from dropping as the holder is raised.

Pastry cones are made with closed and also with open tips or small ends. My holder can be used for either type of cone, it being only necessary to make the cup portion of a depth to suit the depth of the cone used.

With the pastry cone in place my holder may be used as a scoop with which to pick up the ice cream, which consequently fills the pastry cone. The turned edge 4 protects the cone, and also acts as a stiff cutting blade against the ice cream.

Constant use of a scoop or holder of this type in ice cream, some of which is very stiff, would at length produce looseness of the arms 5 and 6 about the hinge 7, with the result that the cup parts 2 and 3 would not come together fairly, and the usefulness of the instrument would be very much reduced. To provide against this I close the lower extremity of the cup with the half bottoms 11 and 12, one of which is provided with a tongue 13, and the other with a groove 14. By means of this tongue and groove endwise motion of either of the cup parts 2 and 3, relatively to one another, is prevented when the cup is closed. This arrangement is shown in detail in Fig. IV. Here the tongue and groove are shown of conventional form. They can as readily be made in sheet metal, the whole cup and the arms being of the same material. It is evident that instead of a tongue and groove a dowel pin and hole may be used. Locking means can also be formed in the vertical edge of the cup, but the bottom location is the stronger and the more sanitary.

It will be noted that my cone holder is composed of few parts, substantially designed, and so disposed that the holder is easily inspected and cleaned. It is also simple to manufacture, and is durable.

I claim, and desire to protect by Letters Patent of the United States:

1. A pastry cone holder consisting of a hollow cone split in the plate of its axis, handles attached one to each of the parts of the hollow cone and hinged together at their farther ends, a spring arranged to hold the hinged handles normally apart, a stop to limit the opening of the hinge, and locking means to limit motion of the parts of the hollow cone relatively to one another in the direction of their axis.

2. A pastry cone holder consisting of a hollow cone split in the plane of its axis, handles attached one to each of the parts of the hollow cone and hinged together at their farther ends, a spring arranged to hold the hinged handles normally apart, and a stop to limit the opening of the hinge.

3. A pastry cone holder consisting of a hollow cone split in the plane of its axis, handles attached one to each of the parts of the hollow cone and hinged together at their farther ends, and a stop to limit the opening of the hinge.

4. A pastry cone holder consisting of a hollow cone split in the plane of its axis, handles attached one to each of the parts of the hollow cone and hinged together at their farther ends, and locking means to limit the motion of the parts of the hollow cone relatively to one another in the direction of their axis.

5. A pastry cone holder consisting of a hollow cone split in the plane of its axis, handles attached one to each of the parts of the hollow cone and hinged together at their farther ends, a stop to limit the opening of the hinge, and locking means to limit motion of the parts of the hollow cone relatively to one another in the direction of their axis.

6. A pastry cone holder consisting of a two part conical receptacle provided at its larger end with an inwardly disposed portion, two arms attached by one end each to one of the parts of the receptacle and hinged together at their farther ends so that when they are swung on the hinge the two parts of the receptacle may be brought together, a spring arranged to act against the arms to open the hinge to hold the two parts of the receptacle normally apart, a stop to limit the opening of the hinge, and locking means to limit motion of the two parts of the receptacle relatively to one another in a plane normal to the hinge movement.

7. A pastry cone holder consisting of a two part conical receptacle provided at its larger end with an inwardly disposed portion, two arms attached by one end each to one of the parts of the receptacle and hinged together at their farther ends so that when they are swung on the hinge the two parts of the receptacle may be brought together, a spring arranged to act against the arms to open the hinge to hold the two parts of the receptacle normally apart, and a stop to limit the opening of the hinge.

MAX SCHWARZ.

Witnesses:
KENNETH H. CHADICK,
G. W. GODDIN.

Copies of this patent may be obtained for five cents each, by addressing the "Commissioner of Patents, Washington, D. C."